Dec. 31, 1940.   R. LOZIVIT   2,227,267
CARBURETOR
Filed Aug. 26, 1938
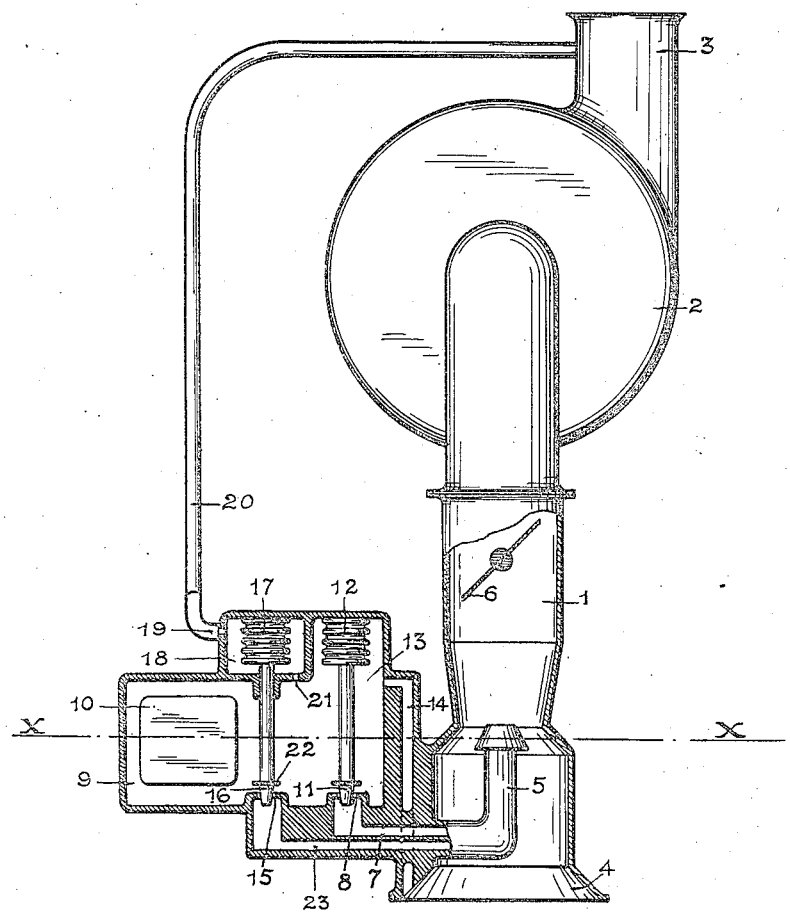
INVENTOR.
René Lozivit
BY A. R. M. McGrady
ATTORNEY.

Patented Dec. 31, 1940

2,227,267

UNITED STATES PATENT OFFICE 2,227,267

CARBURETOR

René Lozivit, Paris, France, assignor to Societe Generale des Carburateurs Zenith, Geneva, Switzerland Application August 26, 1938, Serial No. 226,867
In France September 1, 1937

5 Claims. (Cl. 261—41)

The present invention relates to carburetors for internal combustion engines and more particularly to carburetors for airplane engines comprising a main nozzle for normal operation of the engine and a power nozzle for a period of operation when the pressure in the induction passage exceeds a predetermined value. The power nozzle is adapted to enrich the combustible mixture delivered to the engine at or about the full power of the latter or, more definitely, when the induction pressure is of about the maximum permissible value.

Usually the main nozzle is controlled automatically in response to the altitude so that the composition of the combustible mixture remains correct when the altitude varies. The power nozzle, however, is not so controlled with the result that, when the altitude increases, the ratio of the fuel delivered by this power nozzle to the amount of air entering the engine increases, and hence the combustible mixture delivered to the engine during periods of high output becomes too rich or at least richer than is necessary.

An object of the present invention is to provide a carburetor including means for supplying supplementary fuel when the induction pressure exceeds a predetermined value, the amount of this supply being varied in accordance with changes in altitude.

Another object of the invention is to provide a carburetor in which means are provided for supplying supplementary fuel to the engine during periods of high power output, said means being controlled in response to the pressures prevailing in the air intake and in the induction passage.

A further object of the invention is to provide a carburetor in which the valve controlling the power nozzle is operated by a manometric element which is responsive to a pressure which is a function of the pressures prevailing in the air intake and in the induction passage.

Another object of the invention is to provide a carburetor in which the valve controlling the power nozzle is operated by a manometric element located in a chamber which communicates through calibrated orifices respectively with the induction passage posterior to the throttle, or posterior to the supercharger if one is used, and with the air intake of the carburetor or with the atmosphere.

Further objects and advantages of the invention will appear from the following description taken in conjunction with the accompanying drawing wherein the single figure is a view in elevation and partly in section.

The carburetor which is shown on the figure comprises a carbureting chamber connected to the inlet of a supercharger 2 having its outlet 3 connected to the induction passage of the engine (not shown). The carbureting chamber 1 is fed with air by the air inlet 4 and with fuel by the fuel outlet 5 which may be of any suitable type. The fuel outlet 5 may, for example, comprise the usual devices adapted to aerate the fuel before its delivery into the carbureting chamber 1. The amount of mixture admitted to the engine is controlled by means of a throttle valve 6 operated by the driver in a manner which is not illustrated. The control of the throttle valve 6 may, for example, comprise a boost control which limits the opening of the throttle valve in such a way that the induction pressure at the outlet 3 of supercharger 2 does not exceed the maximum permissible induction pressure. The supercharger 2 may be dispensed with.

The fuel for normal operation is led to the fuel outlet 5 by a conduit 7 in which is mounted a calibrated orifice 8 (main orifice) to which fuel is supplied from the float chamber 9. The fuel level in float chamber 9 is maintained substantially at line $x$—$x$ by means of a float member 10 which controls, as known, the admission of fuel to the chamber. The effective area of the orifice 8 is varied by a tapered needle 11 connected to a manometric member 12 mounted in the portion 13 of the chamber 9 above the fuel level. The portion 13 communicates by a conduit 14 with the air inlet 4 so that the manometric element 12 is submitted to the pressure prevailing in the air inlet 4. The space 13 might also open directly in the atmosphere.

When the altitude increases, the atmospheric pressure decreases, the manometric element 12 expands and the needle 11 moves downwardly to further restrict the orifice 8. The contour of needle 11 is such that the composition of the combustible mixture which is formed in the carbureting chamber 1 remains correct when the altitude varies.

The fuel outlet 5 communicates also with the float chamber 9 by a conduit 23 and a calibrated orifice 15 (power orifice). The orifice 15 is controlled by a needle 16 having a collar 22 thereon and connected to a manometric element 17. The manometric element 17 is mounted in a chamber 18 communicating, through a calibrated orifice 19 and a conduit 20, with the supercharger outlet 3 and, through a calibrated orifice 21, with the portion 13 of chamber 9 (or with the atmosphere). Therefore, the value of the pressure prevailing in the chamber 18 is comprised between the values of the induction pressure and the pressure in the inlet 4 (atmospheric pressure). Generally, the section of the calibrated orifice 21 is less than that of calibrated orifice 19 in order that the variations of the induction pressure influence the pressure in chamber 18 to a greater extent than the variations of the atmospheric pressure.

The operation of the device is the following:

For openings of the valve 6 substantially less than to the maximum permissible opening, the induction pressure is substantially lower than the maximum permissible induction pressure. The pressure in chamber 18 is insufficient to permit opening of the orifice 15 by the manometric element 17. The collar 22 of needle 16 is thus urged against the upper face of the orifice 15 which constitutes a seat for this collar. The fuel is supplied to the carburetor only through the main orifice 8, the output of which is controlled by needle 11 so that the amount of fuel remains correct whatever be the altitude.

If the valve 6 is gradually opened, the induction pressure increases and the pressure in the chamber 18 also increases. When the pressure in this chamber exceeds a predetermined value, the contraction of manometric element 17 lifts needle 16 from its seat and the orifice 15 begins to operate so as to deliver an additional amount of fuel to enrich the mixture delivered to the engine. When the opening of valve 6 is such that the induction pressure reached the maximum permissible pressure, needle 16 is in a predetermined position which permits the enrichment corresponding to the full engine power.

If the altitude increases, the atmospheric pressure decreases and for an equal value of the induction pressure, the pressure in chamber 18 becomes weaker and the opening controlled by needle 16 decreases. The opening of needle 16 which corresponds to the maximum permissible induction pressure, that is to say the full engine power, thus decreases when the altitude increases and the power orifice 15 is thus controlled in response to the altitude. The contour of needle 16 and the relative section of the calibrated orifices 19 and 21 are so designed that the enrichment provided by the operation of the power orifice has a correct value for every altitude.

It is to be noted that when the altitude increases, the power orifice begins to operate for a higher value of the induction pressure; in other words, when the valve 6 is gradually opened by the driver, the operation of said orifice is delayed. This does not involve any disadvantage since the pressure beyond which the power enrichment is required is not defined in an accurate manner.

An embodiment of the invention has been shown in a very diagrammatic way because any man skilled in the art knows the structure of a nozzle, an altimetric control valve, and the control thereof by a manometric element, etc.

The details of the embodiments of the invention can be modified in many ways. For example, the power orifice can feed a fuel outlet different from the main fuel outlet.

It is to be understood that the form of the invention herewith shown and described is to be considered as exemplary and not limitative and that various changes in the shape, size and arrangements of the parts may be resorted to without departing from the spirit of the invention or the scope of the subjoined claims.

What I claim is:

1. In a carburetor for an internal combustion engine having a supercharger connected posterior thereto, a fuel reservoir, an induction passage having an air intake, a main fuel duct connecting the reservoir and the passage, means responsive to variations in altitude for varying the flow through said duct, a supplementary fuel duct connecting the reservoir and the passage, a chamber separate from the reservoir, calibrated connections from said chamber to the air intake and to the induction passage posterior to the supercharger, a normally closed valve in said supplementary fuel duct and pressure responsive means located in said chamber and connected to said valve for opening the valve when the pressure posterior to the supercharger exceeds a predetermined value.

2. In a carburetor for an internal combustion engine having an air intake, an induction passage and a throttle therefor, a supercharger in the induction passage, a fuel chamber, a main fuel supply conduit controlled according to altitude, an air chamber separate from the fuel chamber, a calibrated passage connecting the air chamber with the induction passage posterior to both the throttle and the supercharger, a second calibrated passage connecting the air chamber with said intake, a collapsible bellows in the air chamber, a supplementary fuel supply conduit, valve means for controlling the supplementary fuel supply conduit, and an operative connection between said bellows and said valve means to open the latter upon attaining a predetermined pressure in said air chamber.

3. A carburetor for an internal combustion engine having a supercharger on the downstream side thereof, said carburetor comprising a fuel chamber and an induction passage having an air inlet, means forming a main fuel conduit from the chamber to the passage, means forming a supplementary fuel conduit from the chamber to the passage, a valve for controlling the supplementary fuel conduit, and means subjected at all times to a resultant absolute pressure derived from the pressure at the air inlet and the pressure from the induction passage posterior to the supercharger for opening said valve upon rise in said resultant absolute pressure above a predetermined value.

4. In a charge forming device for an internal combustion engine, an induction passage including a supercharger and a throttle, a fuel chamber, means for supplying fuel from the chamber to the induction passage, an air chamber separate from the fuel chamber, a calibrated passage connecting the air chamber with a source of atmospheric pressure, a second calibrated passage connecting the air chamber with the induction passage posterior to both the throttle and the supercharger, a valve for controlling said fuel supply means, and means subjected to the resultant absolute pressure in said chamber for actuating said valve.

5. A charge forming device including an induction passage having, in the following order, an atmospheric intake, a fuel discharge nozzle, a throttle valve and a supercharger; a fuel chamber, conduit means for conducting fuel from the chamber to said nozzle, a valve adapted, when closed, to partially restrict said conduit means whereby a normal mixture is provided, said valve, when opened, being adapted to supply supplemental fuel to said conduit means for providing an enriched mixture, walls defining a chamber separate from the fuel chamber, said walls having a pair of calibrated apertures, passage means subjecting one of said apertures to air at the atmospheric pressure in the intake, other passage means supplying fluid at supercharger outlet pressure at all times to the other of said apertures whereby a resultant pressure varying with both atmospheric and supercharger pressures is produced in said chamber, and a barometric capsule subjected to said resultant pressure and operatively connected to open said valve when the resultant pressure attains a predetermined value.

RENÉ LOZIVIT.

CERTIFICATE OF CORRECTION.

Patent No. 2,227,267.                                                                December 31, 1940.

RENE LOZIVIT.

It is hereby certified that error appears in the printed specification of the above numbered patent requiring correction as follows: Page 1, first column, line 5, for "a period" read --periods--; and line 22, after "high" insert --power--; page 2, first column, line 14, strike out "to"; line 35, for "reached" read --reaches--; and that the said Letters Patent should be read with this correction therein that the same may conform to the record of the case in the Patent Office.

Signed and sealed this 10th day of February, A. D. 1942.

(Seal)
Henry Van Arsdale,
Acting Commissioner of Patents.